2,734,802
METHOD FOR THE DETECTION OF PATHOLOGICAL QUANTITIES OF PROTEIN IN THE URINE

Karl Philipp Closs, Oslo, Norway

No Drawing. Application June 14, 1952,
Serial No. 293,673

Claims priority, application Norway June 14, 1951

8 Claims. (Cl. 23—230)

The invention relates to a method of detection of pathological amounts of protein in the urine by use of a precipitating reagent.

The defects of Heller's test (by means of 25% nitric acid) for detection of protein or albumin in the urine are generally known. Very often it gives false precipitations of uric acid, urea, etc. or coloured rings produced by gallic dye, indican, etc. For this reason Heller's test has in many countries been abandoned in favour of the sulphosalicylic acid test in various modifications, but these are not very easy to carry out.

The present method of indicating the presence of pathological quantities of protein in the urine is based on the discovery that polythionates precipitate protein in acid solution (pH=about 1.5) already in very low concentration. Thus polythionate solutions can in general be used as an agent for the detection of protein.

The polythionates to be used are usually alkali metal polythionates and in particular K-polythionate. However, polythionates of other metals can also be used, but not polythionates of metals which in themselves give precipitation with protein or with other urine constituents, for example phosphates.

Further, it has been found that the concentration of the polythionate solution must not exceed certain limits, as otherwise satisfactory results will not be obtained.

Thus when it relates to the detection of protein in urine it appears that a 5% aqueous polythionate solution gives many false precipitations. By using a polythionate concentration of less than 2% the precipitation will be suitably sensitive for the detection of pathological amounts of protein without giving precipitation in normal urines.

Satisfactory results can be obtained with a polythionate concentration as low as 0.05%. The concentration employed will depend on the special method used for detection of protein.

The new reagent can be used for the replacement of both the sulphosalicylic test and Heller's test. In the former case the reagent and filtered urine are mixed together, and it is observed whether any turbidity arises, which by increase of heat becomes more pronounced.

In this case it is most convenient to use a 0.2–0.50% solution, preferably 0.25–03%, of sodium polythionate. It has been found that a very satisfactory precipitation is obtained by the addition of 10 drops urine (not necessarily filtered) to 2 ml. of this solution. The least trace of protein in the urine will show itself by the fact that turbidity immediately forms. This is dependent on the amount of protein. With larger quantities of protein this will flocculate, either at once or after standing. Heating is not necessary.

The reagent is, however, also very well suited as a substitute for Heller's test. In such case a polythionate concentration from 0.5 to 2.0% and preferably a concentration of 0.75–1.0% is used. But a solution with this concentration has such a low specific gravity that it will too easily mix with the urine, which is undesirable when used as a substitute for Heller's test.

To meet this difficulty a neutral salt, e. g. NaCl is added to the solution in such quantity that the specific weight of the solution is sufficiently increased. Experiments have shown that the specific weight should be at least 1.05. With the concentrations of polythionates which will be relevant a sufficient specific gravity will be obtained by the addition of 5–10% NaCl, e. g. about 7%.

Following the same procedure as in Heller's test, a distinct precipitation of the protein present can be observed with this reagent below the boundary surface between the two layers of liquids. Neither colouring nor precipitation will occur above the boundary surface.

The new reagent can be placed on the market in ready diluted state for use as a substitute either for Heller's test or for the sulphosalicylic test, or the reagent can also be marketed in a more concentrated form, so that, when the reagent is to be used, it is only necessary to dilute it with certain quantities of water in order to get the desired concentration.

I claim:

1. A method for the detection of pathological quantities of protein in urine through the addition of a turbidometric reagent comprising adding to urine an aqueous acidic solution of potassium polythionate in a concentration of from about 0.05% to about 2.0% by weight of said aqueous acidic solution.

2. A method for the detection of pathological quantities of protein in urine through the addition of a turbidometric reagent comprising adding to urine an aqueous acidic solution of potassium polythionate in a concentration of from about 0.2% to about 0.5% by weight of said aqueous acidic solution.

3. A method for the detection of pathological quantities of protein in urine through the addition of a turbidometric reagent comprising adding to urine an aqueous acidic solution of potassium polythionate in a concentration of from about 0.25% to about 0.3% by weight of said aqueous acidic solution.

4. A method for the detection of pathological quantities of protein in urine through the addition of a turbidometric reagent comprising adding to urine an aqueous acidic solution of alkali metal polythionate in a concentration of from about 0.05% to about 2.0% by weight of said aqueous acidic solution.

5. A method for the detection of pathological quantities of protein in urine through the addition of a turbidometric reagent comprising adding to urine an aqueous acidic solution of potassium polythionate in a concentration of from about 0.05% to about 2.0% by weight of said aqueous acidic solution, said aqueous solution containing from about 5 to 10% of NaCl.

6. A method as in claim 5 wherein the concentration of said potassium polythionate is from about 0.75% to about 1.0% and the concentration of the NaCl from about 6% to about 8%.

7. A turbidometric reagent for the detection of pathological quantities of protein in urine comprising essentially an aqueous acid solution of potassium polythionate in a concentration of from about 0.05% to about 2.0% by weight of solution.

8. A turbidometric reagent for the detection of pathological quantities of protein in urine comprising essentially an aqueous acid solution of potassium polythionate in a concentration of from about 0.05% to about 2.0% by weight of solution, said solution having a pH of about 1.5 and containing sodium chloride dissolved in an amount sufficient to provide a specific gravity of the solution in excess of 1.05.

References Cited in the file of this patent

"Advances in Protein Chemistry," by Anson et al., vol. III, 1927, Academic Press Inc., Publishers, N. Y., pp. 422–424.

Hackh's Chemical Dictionary, third ed., Blakiston Co., Philadelphia, page 673.